(12) United States Patent
Foster et al.

(10) Patent No.: US 7,953,830 B2
(45) Date of Patent: May 31, 2011

(54) AUTOMATIC NETWORK RECONFIGURATION UPON CHANGES IN DHCP IP ADDRESSES

(75) Inventors: Robert K. Foster, Austin, TX (US); Ajay K. Mahajan, Austin, TX (US); Charles A. McLaughlin, Round Rock, TX (US); Hemlata N. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/557,222

(22) Filed: Nov. 7, 2006

(65) Prior Publication Data

US 2008/0109539 A1    May 8, 2008

(51) Int. Cl.
  *G06F 15/177* (2006.01)
  *G06F 15/173* (2006.01)
  *H04L 12/28* (2006.01)

(52) U.S. Cl. ........ 709/221; 709/202; 709/225; 370/389; 370/406

(58) Field of Classification Search .................. 709/217, 709/218, 219, 220–222
See application file for complete search history.

(56) References Cited

U.S. PATENT DOCUMENTS

| | | | |
|---|---|---|---|
| 6,009,103 A | 12/1999 | Woundy | |
| 6,862,286 B1 | 3/2005 | Tams et al. | |
| 2002/0021689 A1* | 2/2002 | Robbins et al. | 370/352 |
| 2002/0065806 A1 | 5/2002 | Kim | |
| 2002/0138614 A1* | 9/2002 | Hall | 709/225 |
| 2004/0122974 A1 | 6/2004 | Murakami | |
| 2004/0177133 A1* | 9/2004 | Harrison et al. | 709/220 |
| 2005/0013280 A1 | 1/2005 | Buddhikot et al. | |
| 2005/0198344 A1 | 9/2005 | Fujita | |
| 2005/0272481 A1 | 12/2005 | Kim | |
| 2006/0047791 A1 | 3/2006 | Bahl | |
| 2006/0050673 A1 | 3/2006 | Park et al. | |

(Continued)

FOREIGN PATENT DOCUMENTS

JP    2004064204 A  *  2/2004

OTHER PUBLICATIONS

Charles E. Perkins and al.; Using DHCP with computers that move; 1995;1;341-353.*

(Continued)

*Primary Examiner* — Ashok B Patel
*Assistant Examiner* — Evans Desrosiers
(74) *Attorney, Agent, or Firm* — Stephen J. Walder, Jr.; Libby Z. Toub

(57) ABSTRACT

Generally speaking, systems, methods and media for detection and network reconfiguration upon changes in dynamic host configuration protocol (DHCP) IP addresses are disclosed. Embodiments of a method may include setting a renew time and a rebind time of a DHCP configuration and establishing an IP address with a first DHCP server. Embodiments may also include, after passage of the renew time, transmitting a renew request to the first DHCP server at its IP address and, in response to failure to receive an acknowledgement message from the first DHCP server, determining if the first DHCP server IP address is still valid. Embodiments may also include, in response to determining that the first DHCP server IP address is not still valid, retrieving a second, different DHCP server IP address from a network change event signal and configuring a network adapter based on the second DHCP server IP address.

16 Claims, 4 Drawing Sheets

U.S. PATENT DOCUMENTS

2007/0140239 A1* 6/2007 Bauer et al. .................. 370/389

OTHER PUBLICATIONS

Banerjee, D., et al., "Method, System and Article for Advance Lease Negotiation in DHCP," U.S. Appl. No. 11/034,274, filed Jan. 12, 2005, Pending.

Banerjee, D., et al., "Apparatus and Method of Dynamically Updating Dynamic Host Configuration Protocol (DHCP) Options," U.S. Appl. No. 10/082,416, filed Feb. 26, 2002, Pending.

Gloe, C. T., "Automatic Domain Name Update," U.S. Appl. No. 10/279,789, filed Oct. 24, 2002, Pending.

* cited by examiner

AUTOMATIC NETWORK RECONFIGURATION UPON CHANGES IN DHCP IP ADDRESSES

FIELD OF INVENTION

The present invention is in the field of data processing systems and, in particular, to systems, methods and media for detection and network reconfiguration upon changes in dynamic host configuration protocol (DHCP) IP addresses.

BACKGROUND

Computer systems are well known in the art and have attained widespread use for providing computer power to many segments of today's modern society. Computer systems such as personal computers (PCs) and servers may typically include a system unit having a central processing unit (CPU) and associated volatile and non-volatile memory, including random access memory (RAM) and basic input/output system read only memory (BIOS ROM), a system monitor, a CD-ROM or DVD-ROM drive, a fixed disk storage drive (also known as a "hard drive"), user input devices, and a network interface adapter. One of the distinguishing characteristics of these systems is the use of a motherboard or system planar to electrically connect these components together. Computer systems typically include software such as computer programs in addition to the hardware. As advances in semiconductor processing and computer architecture continue to push the performance of computer hardware higher, more sophisticated computer software has evolved to take advantage of the higher performance of the hardware, resulting in computer systems that continue to increase in complexity and power.

Computer systems have thus evolved into extremely sophisticated devices that may be found in many different settings. Many organizations utilize server computer systems for more complicated tasks such as providing e-commerce websites, providing complex multi-user applications, maintaining large databases, or performing other resource-intensive tasks. Organizations with significant computing needs often have many servers performing a wide variety of tasks with the servers communicating with each other via a network such as a local area network (LAN). In these systems, individual users may interact with the servers to access various system resources, such as applications, databases, or other resources, so that the system resources may be shared by multiple users.

Networks typically operate under a protocol such as Transmission Control Protocol/Internet Protocol (TCP/IP) to enable communication between computer systems with configured addresses. Part of the burden an administrator must face in administering such a network is address assignment for machines on the network. The dynamic host configuration protocol (DHCP) gives network administrators a method to facilitate automatic distribution of addresses and to maintain the network configuration in a central location. DHCP is an application-layer protocol that allows a client machine on a network to exchange packets between a software daemon on the client with another on a DHCP server to get a network address (in the case of DHCP, an IP address). The DHCP server typically leases the IP address to clients for an infinite timeframe such that the assigned IP address remains the same. In a typical system, if the network is reconfigured, the client may disconnect and reconnect back in to receive a new IP address. Such a disconnect, however, results in an interruption of service to the client and may thus be undesirable in many situations.

One application that utilizes a network and for which high reliability is desirable is high-end servers, such as International Business Machine's (IBM's) IBM iSeries and pSeries eServers which may utilize a Hardware Management Console (HMC) acting as a DHCP server and may include components connected via an Ethernet network connection such as bulk power controllers (BPCs) and flexible service processors (FSPs). In certain scenarios, the IP address of the DHCP server changes and the entire system needs to be powered off and rebooted in response so that the DHCP server and clients are properly configured. The power off of the system brings down the reliability, availability, and serviceability (RAS) of the system and may result in additional problems, as re-establishing communications can be more complicated and prone to fault paths. The scenarios that can result in powering off of the system include replacement of the HMC, changing the IP address of the DHCP server, or adding a second redundant HMC to the network. There is, therefore, a need for an effective system for facilitating proper configuration of a DHCP server and/or client without requiring powering off of the entire system.

SUMMARY OF THE INVENTION

The problems identified above are in large part addressed by systems, methods and media for detection and network reconfiguration upon changes in dynamic host configuration protocol (DHCP) IP addresses. Embodiments may include a method for reconfiguring a network by a client. Embodiments of the method may include setting a renew time and a rebind time of a DHCP configuration and establishing an IP address with a first DHCP server, where the IP address has a specified lease time. Embodiments of the method may also include, after passage of the renew time, transmitting a renew request to the first DHCP server at its IP address and, in response to failure to receive an acknowledgement message from the first DHCP server, determining if the first DHCP server IP address is still valid. Embodiments of the method may also include, in response to determining that the first DHCP server IP address is not still valid, retrieving a second, different DHCP server IP address from a network change event signal and configuring a network adapter based on the second DHCP server IP address.

Another embodiment provides a computer program product comprising a computer-useable medium having a computer readable program wherein the computer readable program, when executed on a computer, causes the computer to perform a series of operations for reconfiguring a network by a client. The series of operations may also include setting a renew time and a rebind time of a DHCP configuration and establishing an IP address with a first DHCP server, where the IP address has a specified lease time. The series of operations may also include, after passage of the renew time, transmitting a renew request to the first DHCP server at its IP address and, in response to failure to receive an acknowledgement message from the first DHCP server, determining if the first DHCP server IP address is still valid. The series of operations may also include, in response to determining that the first DHCP server IP address is not still valid, retrieving a second, different DHCP server IP address from a network change event signal and configuring a network adapter based on the second DHCP server IP address.

A further embodiment provides a client computer system in communication with a network. The client computer system may include a network interface module having a registry to store an indication of an IP address for a DHCP server leasing a first IP address to the client computer system. The client computer system may also include a DHCP client in communication with the network interface module to interact with DHCP servers, where the DHCP client includes a renew sub-module to generate renew requests and a rebind sub-module to generate rebind requests. The client computer system may also include a network monitor in communication with the DHCP client, the network monitor having an IP address change detector and an IP address change updater. The IP address change detector may detect a change in IP address for the DHCP server based on a network change event signal. The IP address change updater may modify the stored indication of the IP address for the DHCP server based on a detected change in IP address by the IP address change detector. The client computer system may be a bulk power controller, a flexible service processor, or other system.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
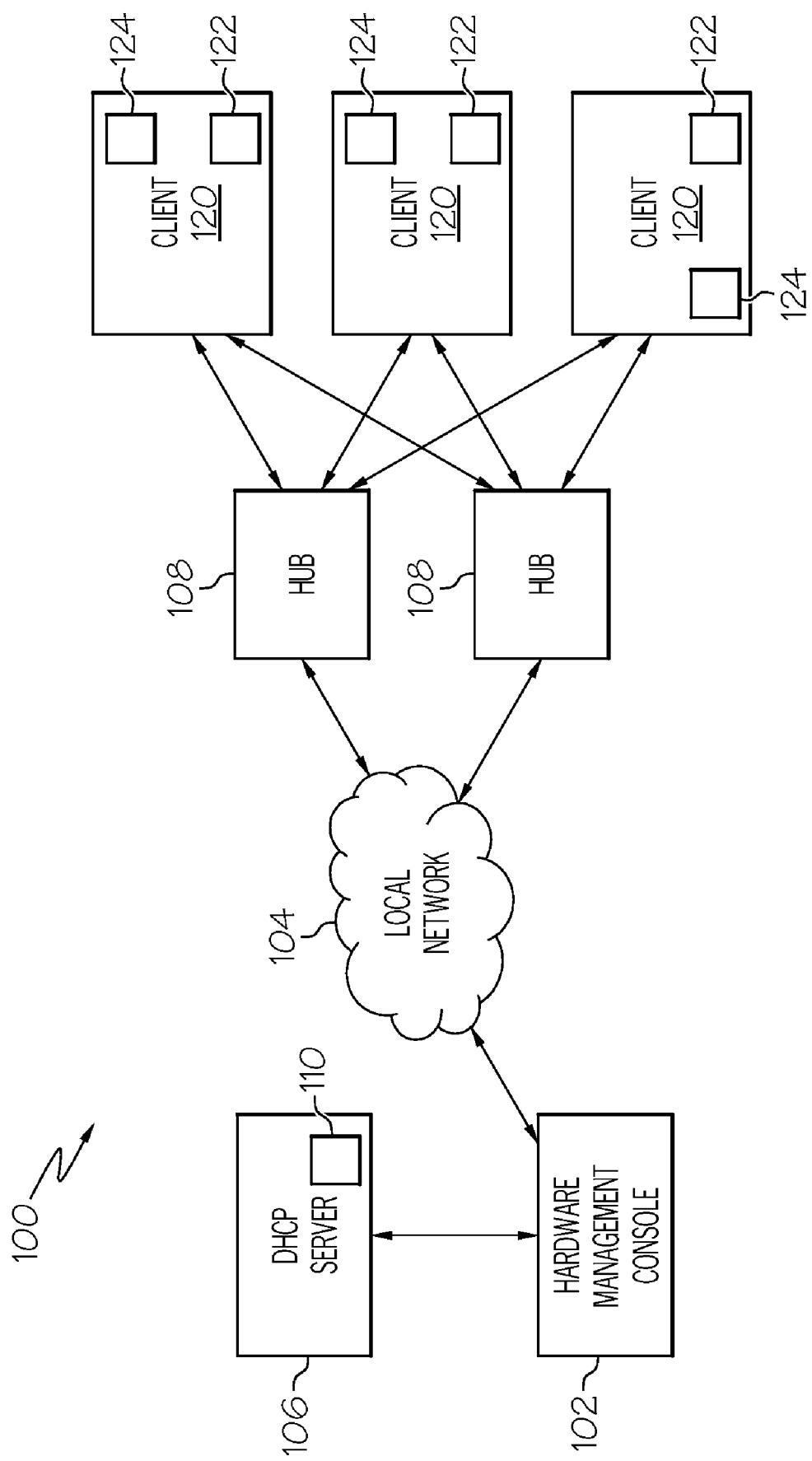
FIG. 1 depicts an environment for an automatic dynamic host configuration protocol (DHCP) reconfiguration system according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for detection and network reconfiguration upon changes in dynamic host configuration protocol (DHCP) IP addresses are disclosed. Embodiments of a method may include setting a renew time and a rebind time of a DHCP configuration and establishing an IP address with a first DHCP server. Embodiments may also include, after passage of the renew time, transmitting a renew request to the first DHCP server at its IP address and, in response to failure to receive an acknowledgement message from the first DHCP server, determining if the first DHCP server IP address is still valid. Embodiments may also include, in response to determining that the first DHCP server IP address is not still valid, retrieving a second, different DHCP server IP address from a network change event signal and configuring a network adapter based on the second DHCP server IP address.

The system and methodology of the disclosed embodiments provide for an effective and efficient mechanism to propagate DHCP server configuration changes to clients while minimizing any disruption in communication to the clients. Utilizing renew and rebind times that are relatively short results in detection of changes to DHCP server configuration and the ability to modify the client configuration accordingly without having to power down the client. DHCP server configuration changes may thus be handled implicitly at the client under the layers such that the network does not go down because of the DHCP server configuration changes. Because the IP change is propagated to the service network components, such as bulk power controllers, communication is not broken, there is no need for a power-off, and the entire process may be transparent to the customer.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk—read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for an automatic dynamic host configuration protocol (DHCP) reconfiguration system according to some embodiments. In the depicted embodiment, the automatic DHCP reconfiguration system 100 includes a hardware management console 102 in communication with a DHCP server 106. The HMC 102 may be in communication with one or more clients 120 via a local network 104. Each client 120 may communication with the local network via one or more hubs 108 in some embodiments. As will be described in more detail subsequently, the clients 120 may interact with the DHCP server 106 to receive an assigned IP address and may also reconfigure when the HMC 102 or DHCP server 106 change configuration.

The components of the automatic DHCP reconfiguration system 100 may represent a server hardware platform such as IBM's IBM iSeries and pSeries eServers server computer systems. While the embodiment of FIG. 1 depicts a server with a local network 104 connecting various components, one of ordinary skill in the art will recognize that other types of computing systems may be utilized with embodiments of the present invention, including any type of computer system with a DHCP server 106 and one or more clients 120.

The HMC 102 may provide converged platform configuration, management, and services for other components of the automatic DHCP reconfiguration system 100. The HMC 102 may execute dedicated applications to provide partition management for single or multiple servers. As an external appliance for managing server resources, the HMC 102 may facilitate control of components such as a flexible service processor (FSP) or bulk power controller (BPC) (i.e., clients 120). In some embodiments, the HMC 102 may be a dedicated workstation adapted to manage a plurality of servers and their components and interact with the servers and their components via local network 104. Local network 104 may be any type of data communications channel or combination of channels, such as the Internet, an intranet, a LAN, a WAN, an Ethernet network, a wireless network, telephone network, a proprietary network, or a broadband cable network. In one example, an Ethernet LAN may be particularly useful as a local network 104 to connect an HMC 102 and various server components. Those skilled in the art will recognize, however, that the invention described herein may be implemented utilizing any type or combination of data communications channel(s) without departure from the scope and spirit of the invention.

The DHCP server 106 may provide for assigning IP addresses to one or more clients 120 via the DHCP application-layer protocol. The DHCP server 106 may be in communication with the HMC 102 to facilitate communication with the clients 102, and in some embodiments the DHCP server 106 may communicate with local network 104 directly. While the DHCP server 106 is depicted in FIG. 1 as being separate from the HMC 120, in other embodiments the DHCP server 106 may be partially or wholly integrated into the HMC 102, such as when the HMC 102 is acting as the DHCP server 106. The DHCP server 106 may assign IP addresses to clients 120 via a negotiation process that is known in the art. The DHCP server 106 may include a network change event signal 110 for transmission over local network 104. The network change event signal 110 may provide an IP change signal over the local network 104 to all clients 120 that are subscribed to the network change event signal 110. The network change event signal 110 may include both an indication that the network configuration has changed as well as an indication of the actual change (e.g., a new DHCP IP address). The network change event signal 110 may transmit the IP change signal, for example, after determining that there is a difference between a last known value of an IP address (such as from a persistent control store) and a current value. Through the use of the network change event signal 110, an IP address and change in network configuration may be propagated to network scripts at the clients 102 and a new IP address may thus be configured.

Figure 3:
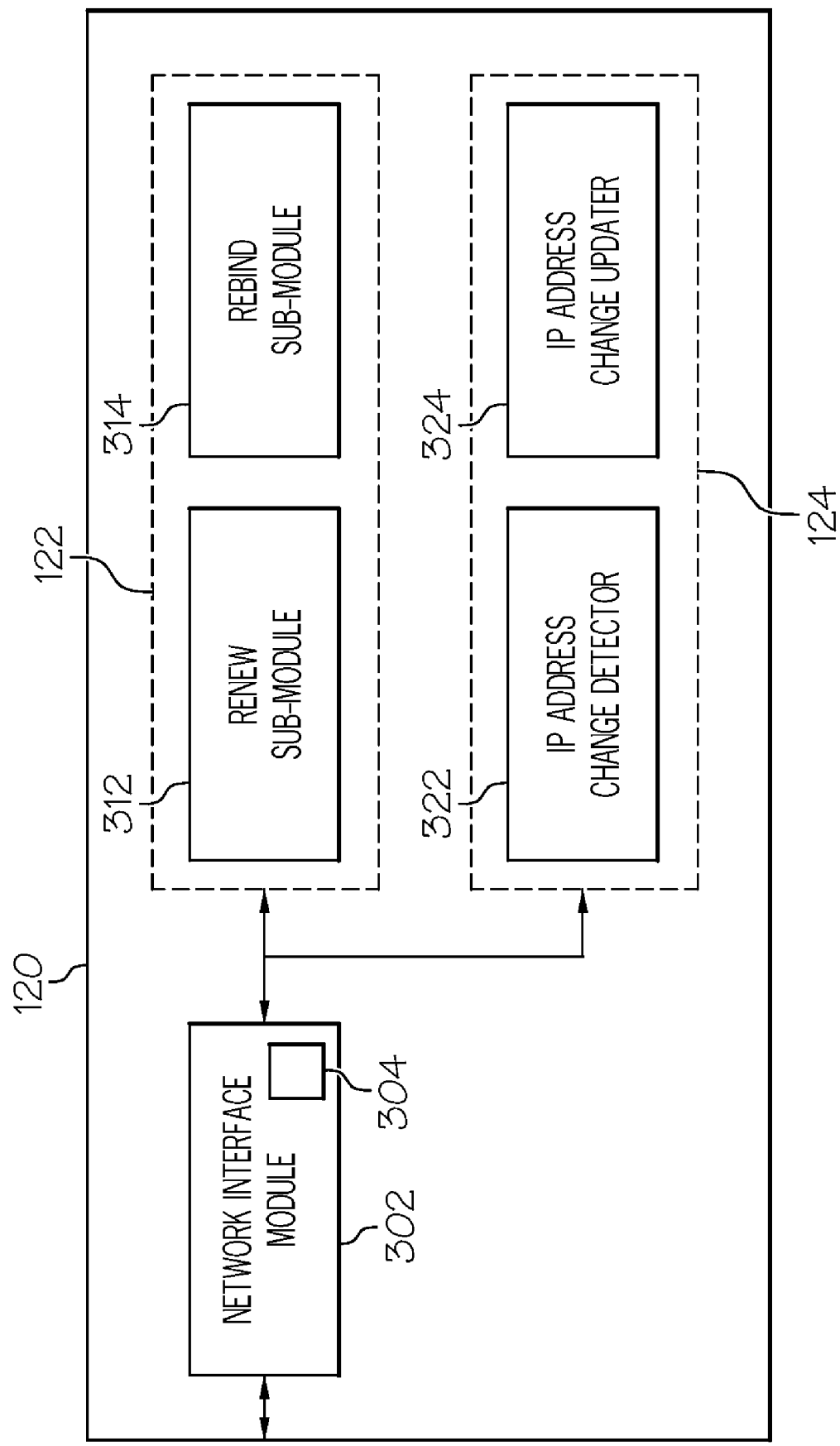
FIG. 3 depicts a conceptual illustration of software components of a client including a DHCP client and network monitor according to some embodiments.

Clients 120, which are described in more detail in relation to FIG. 3, may perform a wide variety of functions for a server system. In some embodiments, clients 120 may be components of a server system such as BPCs, FSPs, or other components and may each be in communication with local network 104. One or more clients 120 may optionally communicate with the local network 104 via a hub 108. Each client 120 may include a DHCP client 122 to facilitate interaction with the DHCP server 106 and may also include a network monitor 124 to detect when changes to network configuration occur as well as the nature of the changes. The DHCP client 122 may negotiate an IP address with a DHCP server 106 and may also generate renew requests and rebind requests. Upon passage of a renew time, the DHCP client 122 may transmit a renew request and upon failure to receive a positive response, may then transmit a rebind request. If both of these requests fail, it may be an indication that the DHCP network configuration has changed. The network monitor 124 may then detect a change in IP address for the DHCP server based on the network change event signal 110 and may modify the client 120 configuration accordingly based on the new network configuration.

The systems and methodologies of the disclosed embodiments provide an efficient and effective mechanism for detection and network reconfiguration upon changes in DHCP IP addresses. The disclosed system may accomplish this task while avoiding the need to reboot the clients 120 and may thus avoid costly and frustrating downtime of server resources. By automatically propagating network configuration changes in the system, the possibility for errors on client 120 reboots may also be avoided.

Figure 2:
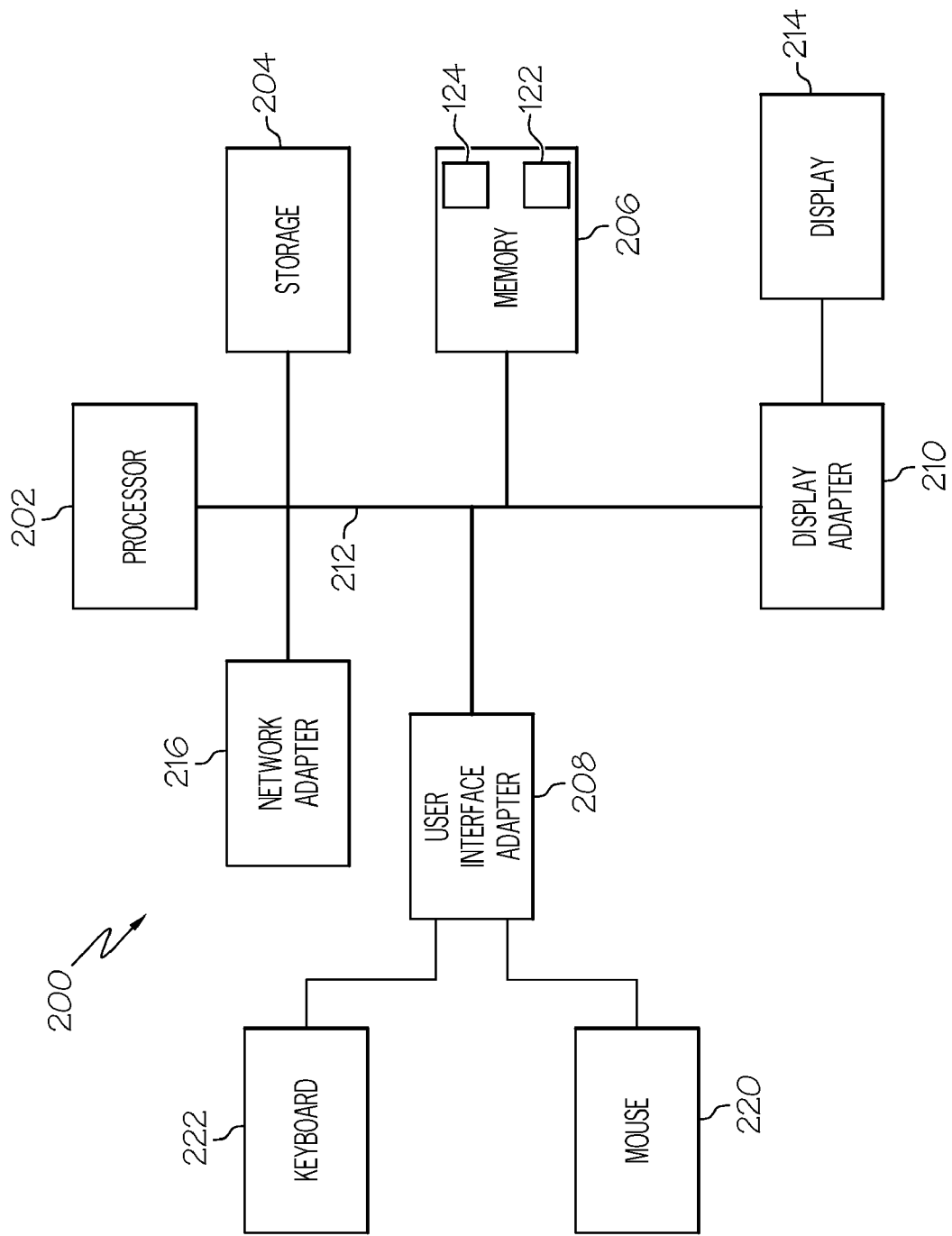
FIG. 2 depicts a block diagram of one embodiment of a computer system suitable for use as a component of the automatic DHCP reconfiguration system, such as an HMC or client.

FIG. 2 depicts a block diagram of one embodiment of a computer system 200 suitable for use as a component of the automatic DHCP reconfiguration system 100, such as a client 120 or HMC 102. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, a display adapter 210, and a network adapter 216 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the DHCP client 122 or network monitor 124, and may temporarily or permanently store information during its calculations or results after calculations in storage 204 or memory 206. All of part of the DHCP client 122, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client 102 requesting permission to access a resource 108 or a consultant generating an RBAC model with an HRBAC modeling system 120, for example, may utilize the keyboard 222 and mouse 220 to interact with the computer systems. The bus 212 may also connect the processor 202 to a display, such as an LCD display or CRT monitor, via the display adapter 210. The network adapter 216 may facilitate communication with a network such as local network 104, and may be an Ethernet LAN adapter in some embodiments.

FIG. 3 depicts a conceptual illustration of software components of a client 120 including a DHCP client 122 and network monitor 124 according to some embodiments. As described previously (and in more detail in relation to FIG. 4), the client 120 may perform various functions for the automated DHCP reconfiguration system 100 and may also detect a change in network configured and modify itself accordingly. A client 120 may include a network interface module 302 in addition to the DHCP client 122 and network monitor 124. The network interface module 302 may facilitate communication between client 120 (and its components) and the local network 104 and/or hub 108, such as by managing the network adapter 216. The network interface module 302 may include one or more registries 304 for storage of information, such as a DHCP server IP address.

As described previously, the DHCP client 122 may facilitate interaction with the DHCP server 106 by negotiating an IP address with the DHCP server 106. Typically, the DHCP client 122 may broadcast a DHCP discover message which is received by the DHCP server 106 and processed. If a free address is available, the DHCP server 106 creates and sends a DHCP offer message containing an IP address and other available option. The DHCP offer message may also include a lease time for the IP address, which is often infinite or very long. The DHCP client 122 receives the offer and, if multiple offers are received, selects the best offer. The DHCP client 122 may then transmit a DHCP request to all DHCP servers 106 in the system specifying its selection. The selected DHCP server 106 sends a DHCP acknowledgement and other DHCP servers 106 may free up the IP address again.

The DHCP client 122 may also generate renew requests and rebind requests via its sub-modules, the renew sub-module 312 and the rebind sub-module 314. The renew sub-module 312 may generate and transmit renew requests to the DHCP server 106 to extend the lease time. The renew sub-module 312 may perform such actions upon passage of the renew time, which may be specified during the negotiations between the DHCP client 122 and DHCP server 106. Upon failure to receive a positive response, the rebind sub-module 314 may then generate to try and find the DHCP server 106. If both of these requests fail, it may be an indication that the DHCP network configuration has changed.

The network monitor 124 may detect when changes to network configuration occur as well as the nature of the changes. The network monitor 124 may perform such actions upon failure of the renew and rebind for the DHCP client 122, as described previously. The network monitor 124 may include modules such as an IP address change detector 322 and IP address change updater 324 to assist it in performing its functions. The IP address change detector 322 may detect a change in IP address for the DHCP server based on the network change event signal 110. The P address change updater 324 may modify the client 120 configuration (i.e., the stored indication of the IP address for the DHCP server in the registry 304) accordingly based on the new network configuration and the detected change in IP address. The network monitor 124 may thus prevent the client 120 from having to disconnect and reboot to acquire the IP address of a newly configured DHCP server 106.

Figure 4:
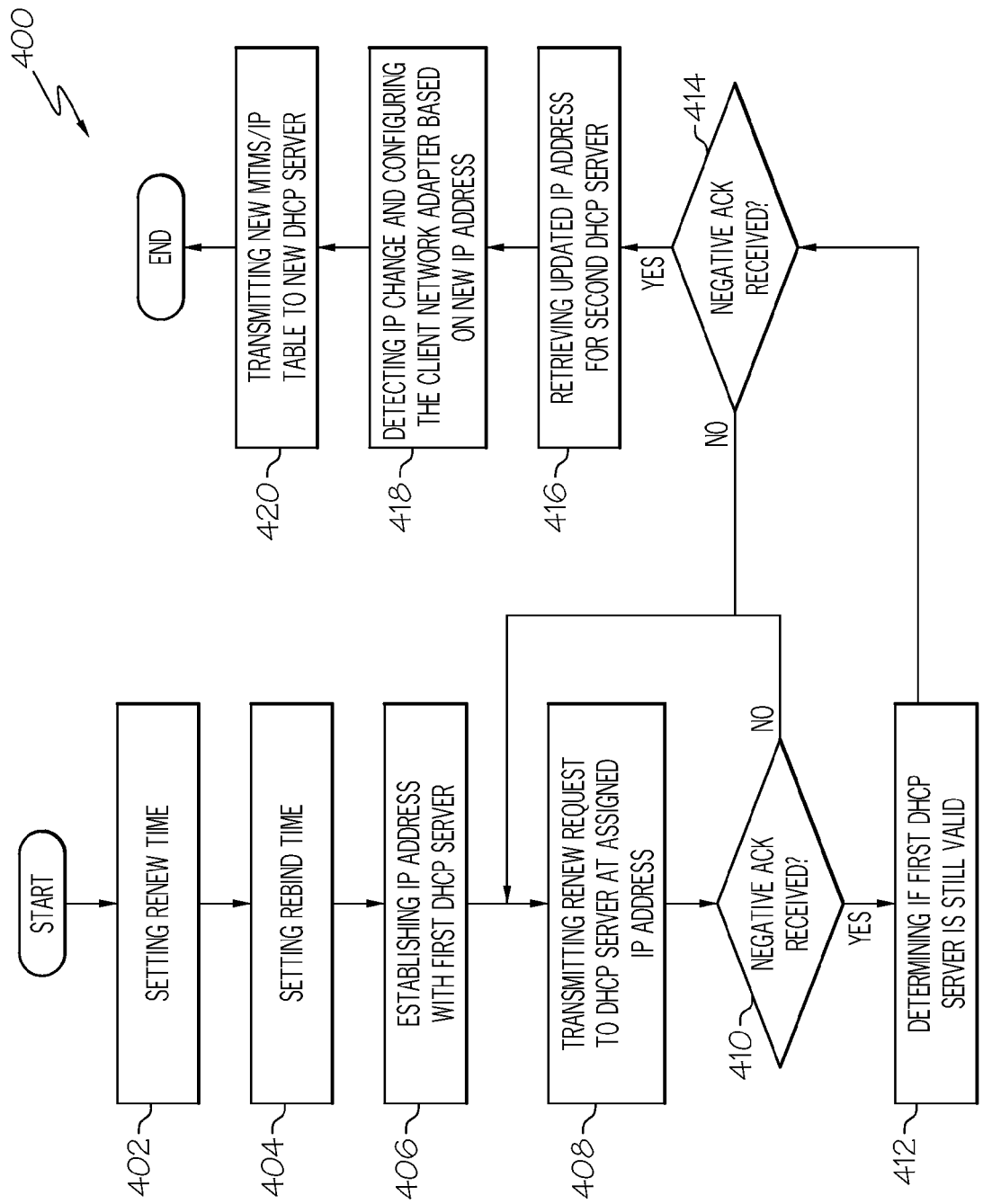
FIG. 4 depicts an example of a flow chart for reconfiguring a network according to some embodiments.

FIG. 4 depicts an example of a flow chart 400 for reconfiguring a network according to some embodiments. The method of flow chart 400 may be performed, in one embodiment, by components of a client 120. Flow chart 400 begins with element 402, setting a renew time, and element 404, setting a rebind time. In some embodiments, the client 120 (and its DHCP client 122) may set the renew time and rebind time during the negotiation with the DHCP server 106 for a leased IP address. As part of setting the times, the DHCP client 122 may activate its renew and rebind functionality. The renew and rebind times may be relatively short, such as under thirty (30) minutes, such that the renew and rebind messages are transmitted frequently enough to maintain the network despite DHCP IP address changes. An administrator may determine optimal times for a particular automated DHCP reconfiguration system 100, and efficient renew and rebind times may depend on factors such as the size of the cluster and the speed of the local network 104. In one example, the rebind time is set to twenty (20) minutes and the renew time is set as fifteen (15) minutes. At element 406, the DHCP client 122 may establish the IP address to be leased by the client 120 with a first DHCP server 106. A procedure for establishing the IP address via negotiation is described in relation to FIG. 4.

The renew sub-module 312 may at element 408 transmit a renew request to the DHCP server 106 at its IP address after passage of the renew time. The DHCP client 122 may then at decision block 410 determine if a negative acknowledgement of the renew request was received. If an acknowledgement was received, the method of flow chart 400 may return to element 408 for continued processing as the DHCP server 106 is still valid. If a negative acknowledgement was received (or no positive acknowledgement was received), the DHCP client 122 may begin determining if the first DHCP server is still at a valid IP address at element 412. To do so, the rebind sub-module 314 may transmit a rebind request to the DHCP server 106 at its assigned IP address and awaiting a response for the rebind time. If a positive acknowledgement is received at decision block 414, the method may return to element 408 for continued processing as the DHCP server 106 is still valid. If a negative acknowledgement is received at decision block 414 (or no positive acknowledgement was received), the procedure for acquiring the new IP address for the DHCP server 106 begins at element 416.

At element 416, the network monitor 124 may retrieve a second, different DHCP server IP address from a network change event signal 110. The network monitor may retrieve such information in the form of part of a message retrieved by ifconfig. The network monitor 124 may at element 418 detect the IP change (by comparison with a last known value) and configure the network adapter 216 based on the second DHCP server IP address. In some embodiments, the relevant registries will be updated as part of the configuration of the network adapter 216. The DHCP client 122 may then transmit a new information table to the DHCP server 106 at element 420, after which the method terminates. The information table may be an mtms/IP table that includes an indication of the IP address being used by the client 120 as well as information such as a machine type, serial number, etc., or other information to identify the client 120.

It will be apparent to those skilled in the art having the benefit of this disclosure that the present invention contemplates methods, systems, and media for detection and network reconfiguration upon changes in DHCP IP addresses. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method for reconfiguring a network, the method comprising:
    setting by a client executing on one or more processors of a computer system and in communication with the network a renew time and a rebind time of a dynamic host configuration protocol (DHCP) configuration;
    establishing by the client an IP address with a first DHCP server, the client IP address having a specified lease time;
    after passage of the renew time, transmitting by the client a renew request to the first DHCP server at its IP address;
    in response to failure to receive an acknowledgement message from the first DHCP server, determining by the client if the first DHCP server IP address is still valid;
    in response to determining that the first DHCP server IP address is not still valid, determining by the client that a new DHCP server IP address is required;
    accessing by the client a network change event signal from a second DHCP server, wherein the second DHCP server transmits the network change event signal over the network to clients subscribing to the network change event signal, the network change event signal comprising an indication of a second DHCP server IP address of the second DHCP server;
    retrieving by the client the second DHCP server IP address from the accessed network change event signal;
    detecting by the client a change in DHCP server IP address by comparing the retrieved second DHCP server IP address to the first DHCP server IP address and determining that the second DHCP server IP address is a different address than the first DHCP server IP address;
    configuring by the client a network adapter based on the second, different DHCP server IP address without disconnecting and reconnecting the client with the network; and
    transmitting by the client to the second, different DHCP server IP address a new information table comprising an indication of the client IP address.

2. The method of claim 1, wherein the renew time is thirty minutes or less, and wherein further the rebind time is thirty minutes or less.

3. The method of claim 1, wherein determining if the first DHCP server IP address is still valid comprises transmitting by the client a rebind request to the first DHCP server at its IP address and awaiting a response for the rebind time.

4. The method of claim 1, wherein retrieving the second, different DHCP server IP address from the network change event signal comprises subscribing to the network change event signal.

5. The method of claim 1, wherein configuring the network adapter based on the second DHCP server IP address comprises updating registries of the client.

6. A computer program product comprising a computer-useable medium of a storage device having a computer readable program, wherein the computer readable program when executed on a computer causes the computer to:
    setting by a client executing on one or more processors of a computer system and in communication with the network a renew time and a rebind time of a dynamic host configuration protocol (DHCP) configuration;
    establishing by the client an IP address with a first DHCP server, the client IP address having a specified lease time;
    after passage of the renew time, transmitting by the client a renew request to the first DHCP server at its IP address;
    in response to failure to receive an acknowledgement message from the first DHCP server, determining by the client if the first DHCP server IP address is still valid;
    in response to determining that the first DHCP server IP address is not still valid, determining by the client that a new DHCP server IP address is required;
    accessing by the client a network change event signal from a second DHCP server, wherein the second DHCP server transmits the network change event signal over the network to clients subscribing to the network change event signal, the network change event signal comprising an indication of a second DHCP server IP address of the second DHCP server;
    retrieving by the client the a second DHCP server IP address from the accessed network change event signal;
    detecting by the client a change in DHCP server IP address by comparing the retrieved second DHCP server IP address to the first DHCP server IP address and determining that the second DHCP server IP address is a different address than the first DHCP server IP address;
    configuring by the client a network adapter based on the second, different DHCP server IP address without disconnecting and reconnecting the client with the network; and transmitting by the client to the second, different DHCP server IP address a new information table comprising an indication of the client IP address.

7. The computer program product of claim 6, wherein the renew time is thirty minutes or less, and wherein further the rebind time is thirty minutes or less.

8. The computer program product of claim 6, wherein determining if the first DHCP server IP address is still valid comprises transmitting a rebind request to the first DHCP server at its IP address and awaiting a response for the rebind time.

9. The computer program product of claim 6, wherein retrieving the second, different DHCP server IP address from the network change event signal comprises subscribing to the network change event signal.

10. The computer program product of claim 6, wherein configuring the network adapter based on the second DHCP server IP address comprises updating registries of the client.

11. A client computer system in communication with a network, the system comprising:
- a network interface module executing on one or more processors of the client computer system and having a registry to store an indication of an IP address for a DHCP server leasing a first client IP address to the client computer system;
- a DHCP client executing on one or more processors of the client computer system and in communication with the network interface module to interact with DHCP servers, the DHCP client comprising a renew sub-module to generate renew requests and a rebind sub-module to generate rebind requests; and
- a network monitor executing on one or more processors of the client computer system and in communication with the DHCP client, the network monitor comprising:
  - an IP address change detector to detect a change in IP address for the DHCP server from a first DHCP server IP address by comparing a second DHCP server IP address retrieved from a network change event signal transmitting over the network from the second DHCP server to any clients subscribing to the network change event signal and determining that the second DHCP server IP address is a different address than the first DHCP server IP address; and
  - an IP address change updater to configure a network adapter based on the second, different DHCP server IP address without disconnecting and reconnecting the client with the network, and to transmit to the second, different DHCP server IP address a new information table comprising an indication of the client IP address based on a detected change in IP address by the IP address change detector.

12. The system of claim 11, wherein the client computer system is a bulk power controller.

13. The system of claim 11, wherein the client computer system is a flexible service processor.

14. The system of claim 11, wherein the network interface module is adapted to control a network adapter, and wherein further the registry is located in the network adapter.

15. The system of claim 11, wherein the renew sub-module generates renew requests based on a renew time of thirty minutes or less.

16. The system of claim 11, wherein the rebind sub-module generates renew requests based on a rebind time of thirty minutes or less.

* * * * *